United States Patent [19]

Frigo

[11] Patent Number: 6,118,565
[45] Date of Patent: Sep. 12, 2000

[54] COHERENT OPTICAL COMMUNICATION SYSTEM

[75] Inventor: Nicholas J. Frigo, Red Bank, N.J.

[73] Assignee: Lucent Technologies Inc., Murray Hill, N.J.

[21] Appl. No.: 08/940,755

[22] Filed: Sep. 30, 1997

[51] Int. Cl.[7] .................................................. H04B 10/00
[52] U.S. Cl. .......................... 359/167; 359/162; 359/127; 359/173; 359/191
[58] Field of Search .................................. 359/167, 162, 359/173, 118, 127, 190–191

[56] References Cited

U.S. PATENT DOCUMENTS

| 5,559,623 | 9/1996 | Darcie et al. | 359/125 |
| 5,559,624 | 9/1996 | Darcie et al. | 359/125 |
| 5,905,586 | 5/1999 | Even | 359/191 |

FOREIGN PATENT DOCUMENTS

| 0145972 | 6/1985 | European Pat. Off. | 359/190 |
| 0685948A1 | 12/1995 | European Pat. Off. | H04J 14/02 |

OTHER PUBLICATIONS

I. W. Stanley, "A Tutorial Review of Techniques for Coherent Optical Fiber Transmission Systems," IEEE Commun. Mag., vol. 23, No. 8, Aug. 1985, pp. 37–53.
Richard A. Linke and Paul S. Henry, "Coherent Optical Detection: A Thousand Calls on One Circuit," IEEE Spectrum Mag., Feb. 1987, pp. 52–57.
A Tutorial Review of Techniques for Coherent Optical Fiber Transmission Systems, by I. W. Stanley, *IEEE Commun. Mag.*, vol. 23, No. 8 pp. 37–53,Aug., 1985.
"Coherent Optical Detection: A Thousand Calls on one Circuit", by R. A. Linke and Paul S. Henry. *IEEE Spectrum Mag.*, pp. 52–57. Feb. 1987.

*Primary Examiner*—Kinfe-Michael Negash
*Attorney, Agent, or Firm*—Julio A. Garceran

[57] ABSTRACT

A coherent optical system includes an optical coupler or combiner for combining a received upstream optical signal and an optical local oscillator signal. The coherent optical system further includes a coherent optical receiver which is configured to receive and process the combined optical signal from the optical coupler to retrieve upstream information from the upstream optical signal. In certain embodiments, the coherent optical communication system includes a central office having an optical source for generating a composite downstream optical signal made up of downstream optical signals of particular wavelengths (or sets of wavelengths). A downstream optical signal having a particular wavelength (or set of wavelengths) is routed to a downstream destination with a portion of the downstream optical signal (after modulation with upstream information) being returned to the central office as an upstream optical signal of the particular wavelength (or set of wavelengths) which is part of a composite upstream optical signal. At the central office, the optical coupler or combiner combines the received upstream optical signal and the optical local oscillator signal, and the coherent optical receiver processes the combined optical signal. The optical source for generating the downstream optical signals can be the same or a similar optical source for generating the local oscillator signal. Thus, the coherent optical system can alleviate the problems and costs associated with generating the local oscillator signal because the same or a similar source is readily available. Using the same or similar optical source to generate the downstream optical signals and the local oscillator system permits an increase in capacity without the additional cost of wavelength-registered and -stabilized optical sources at the subscriber locations.

12 Claims, 3 Drawing Sheets

COHERENT OPTICAL COMMUNICATION SYSTEM

BACKGROUND OF THE INVENTION

1. Field of the Invention

The present invention relates to an optical communication system and, more particularly, to a coherent optical communication system.

2. Description of the Related Art

Fiber optic technology has completely penetrated the long-haul telephony network due to its low loss and high bandwidth. In the area of local loop applications, financially attractive options have developed more slowly. Substantial research effort has been directed towards developing technology to implement fiber optics within local loop applications (e.g., fiber in the local loop). However, cost, capacity, and switching problems associated with implementing fiber optics in local loop applications still must be overcome.

Recently, technologies have developed in an effort to more cost effectively introduce fiber into the local loop. For example, a passive optical network (PON) is an optical transmission system requiring no active components to direct optical signals between a central office (CO) or host digital terminal, and a network subscriber's terminal equipment. PONs typically embody a first star formed of a plurality of optical fibers which extend from a CO to each of a plurality of remote nodes. Each remote node may be envisioned as central to a second star formed of a second plurality of optical fibers extending from the remote node, each to one of a plurality of optical network units (ONU). Two well known PON architectures considered for deploying optical fibers into the local loop are "Telephone Over Passive Optical Networks" (TPON) and "Passive Photonic Loops" (PPL).

In the TPON architecture, the CO broadcasts a common signal to all end users. Information is segregated within the broadcast signal in individual time slots as a time division multiplexed (TDM) signal and/or sub-carrier multiplexed channels. A star coupler at the remote node distributes the broadcast signals to the optical network units. Upstream information is usually transmitted from each ONU within a particular time slot, received at the remote node, multiplexed and directed to the CO. Management of collisions in time and trade off between delivered optical power and the number of end users limits upgradability and deployment of conventional TPON architecture.

In the PPL architecture, each ONU is assigned a unique wavelength and optical information is wavelength segregated within a transmitted signal. In a wavelength division multiplexing (WDM) PON scheme, the CO assigns each ONU a unique wavelength. Optical information is transmitted from the CO to one of a plurality of remote nodes according to wavelength. Each remote node optically demultiplexes its received signals, and directs the demultiplexed signals by wavelength to each ONU. For upstream transmission, each ONU includes a separate optical transmitter at the ONU's assigned wavelength. Each ONU transmits signals to the remote node where the signals are incorporated into a composite signal and transferred to the CO. While WDM PON's have excellent power budgets in general, because all the light intended for a subscriber is directed to that subscriber and vice versa, implementation of WDM PON's is quite costly. For instance, the subscriber must have a wavelength-specific laser at the ONU.

In an effort to reduce the cost of implementing WDM PONs for fiber in loop applications and ameliorate operations, a Communication System Based on Remote Interrogation of Terminal Equipment (RITE-Net®) has been developed and is disclosed in U.S. Pat. No. 5,559,624 to Darcie et al. ("the '624 patent") and is incorporated herein by reference. In the '624 patent, a CO transmits an optical signal, which is modulated with downstream information, to a subscriber's ONU over a wavelength-division multiplexed network. A fraction of this downstream optical signal is detected in the ONU for recovery of the downstream information and the remainder is remodulated with the ONU's upstream information and returned to the CO. As such, the system disclosed in the '624 patent avoids the need of the wavelength-specific optical sources at each ONU. The RITE-Net® system thus lowers the cost for equipment required at each ONU. In addition to the RITE-Net® system providing WDM performance potential at reduced cost, the RITE-Net® system is flexible to allow additional revenue to be produced when it is incorporated into an existing system.

Although the RITE-Net® architecture provides many distinct advantages, at some point in time the need for capacity may become so great that even dedicated lasers with several hundred Mb/s capabilities may be inadequate. At that point, the intrinsic power limitation of having the central office laser supply light for both downstream and upstream signals may constrain the network's capacity. Accordingly, an enhanced optical receiver is needed at the CO to improve the upstream loss budget.

In general, coherent optical receivers include an optical local oscillator laser which is locked to the incoming signal from the remote transmitter, so that a square law photodetector can be utilized in a heterodyne or homodyne mode. In the heterodyne mode, the wavelength of the optical local oscillator laser is separated from the wavelength of the remote transmitter to create a beat frequency in the receiver. In the homodyne mode, the local oscillator is phase-locked to the incoming carrier wave at the same optical wavelength. In both cases, the reference signal from the local oscillator combines with the incoming optical signal at the photodetector surface, and the detector produces a current which is proportional to the product of the two optical signals. In particular, the carrier photocurrent depends linearly on the optical signal field and is effectively amplified by a factor proportional to the electric field produced by the local oscillator. Coherent optical fiber systems have the potential to greatly improve receiver sensitivity and selectivity. These potential increases provided by a coherent receiver could permit more channels to be transmitted on carriers closely spaced in optical frequency, thereby increasing capacity. A disadvantage of coherent optical systems is the necessity of acquiring the received carrier frequency to provide the correct local oscillator frequency for demodulating the received signal because determining, creating and locking the local oscillator frequency is difficult and costly to implement.

Accordingly, an optical communication system is needed which provides the benefits of coherent systems and alleviates the drawbacks.

SUMMARY OF THE INVENTION

The present invention involves a coherent optical communication system for use in an optical network. The coherent optical system includes an optical coupler or combiner for combining a received upstream optical signal and an optical local oscillator signal. The coherent optical system further includes a coherent optical receiver which is configured to receive and process the combined optical signal from the optical coupler to retrieve upstream information from the upstream optical signal. In certain embodiments, the coherent optical communication system includes a central office having an optical source for generating a composite downstream optical signal made up of downstream optical signals of particular wavelengths (or sets of wavelengths). A downstream optical signal having a particular wavelength (or set of wavelengths) is routed to a downstream destination with a portion of the downstream optical signal (after modulation with upstream information) being returned to the central office as an upstream optical signal of the particular wavelength (or set of wavelengths) which is part of a composite upstream optical signal. At the central office, the optical coupler or combiner combines the received upstream optical signal and the optical local oscillator signal, and the coherent optical receiver processes the combined optical signal. The optical source for generating the downstream optical signals can be the same or a similar optical source for generating the local oscillator signal. Thus, the coherent optical system can alleviate the problems and costs associated with generating the local oscillator signal because the same or a similar source is readily available. Using the same or similar optical source to generate the downstream optical signals and the local oscillator system permits an increase in capacity without the additional cost of wavelength-registered and -stabilized optical sources at the subscriber locations.

BRIEF DESCRIPTION OF THE DRAWINGS

Other aspects and advantages of the present invention may become apparent upon reading the following detailed description and upon reference to the drawings in which.

DETAILED DESCRIPTION OF THE DRAWINGS

Illustrative embodiments of the coherent optical distribution system according to the principles of the present invention for an optical distribution network are described below as the system might be implemented to reduce costs and enhance performance associated with current optical distribution networks. Coherent optical signal detection provides several distinct advantages including increased frequency selectivity and effective amplification. The use of the coherent optical communication system in an optical distribution network can provide several distinct advantages. One of the impediments to the use of coherent detection is that it is necessary to acquire the received upstream carrier frequency in order to provide the correct local oscillator (LO) signal frequency to properly demodulate the received upstream signal. Determining, creating, and locking the frequency of the LO signal is often difficult and costly to implement. However, utilizing the RITE-Net® architecture, the upstream signal is derived from a portion of the downstream signal. Accordingly, since the source for generating the upstream is at the central office where it is demodulated, the same or a similar source can be used for generating the LO signal.

Figure 1:
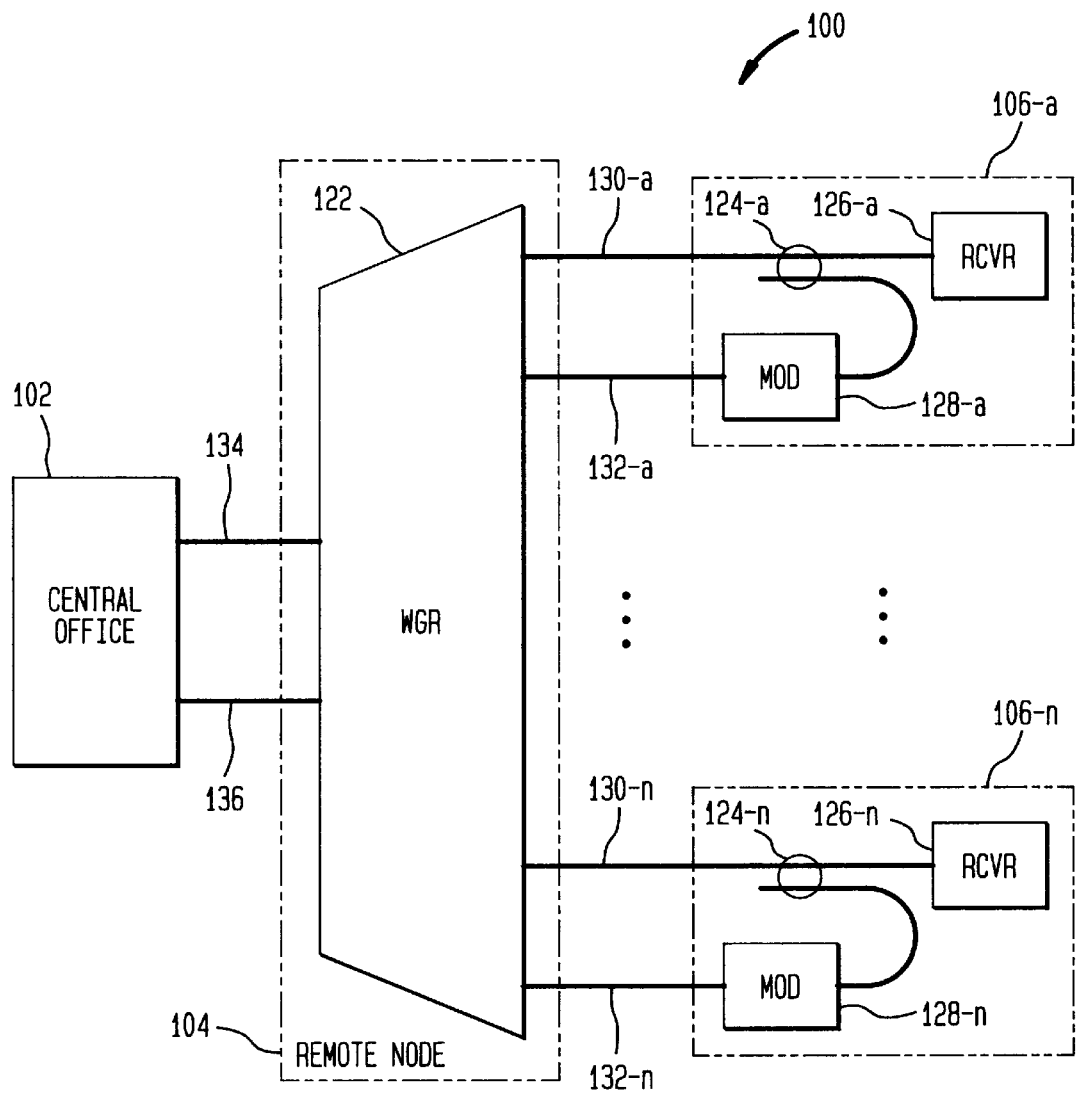
FIG. 1 shows a star optical distribution architecture, such as used in the RITE-Net system.

Referring now to the drawings in which like reference numerals identify similar or identical elements, FIG. 1 depicts an optical network which can include a coherent upstream communication link, and is referred to generally as network 100. Network 100 includes a central office 102 optically linked to remote node 104 via downstream optical fiber 134 and upstream optical fiber 136. Remote node 104 is optically linked to one or more optical network units (ONUs) 106-a through 106-n via one or more pairs of fibers (e.g., downstream optical fibers 130a-n and upstream optical fibers 132a-n). Utilizing a RITE-Net® architecture, downstream optical signals are formed into a composite downstream optical signal or a wavelength-division multiplexed signal (WDM) at the central office 102 and transmitted via fiber 134 to remote node 104. Remote node 104 advantageously includes a wavelength selection device, such as waveguide-grating router (WGR) 122, that routes the appropriate wavelengths (or wavelength ranges) of the WDM signal on fiber 134 to the appropriate ONU 106. Accordingly, each ONU 106 receives an appropriate signal at its assigned wavelength (or set of wavelengths).

As shown each ONU 106a-n splits the signal received via fiber 130a-n using splitter 124a-n respectively. Splitter 124 can consist of an optical splitter, for example, that directs a portion of the energy of the optical signal to receiver 126 and a portion of the energy of the optical signal to modulator 128. Alternatively, all or some of these components can be in integrated form. Additionally, modulator 128 can provide optical gain. Modulator 128 overmodulates (e.g., it potentially modulates over an incoming signal which has already been modulated) the split portion of optical signal with upstream information which is then transmitted to remote node 104 via fiber 132. At remote node 104, the upstream optical signals from each ONU 106a-n are optically combined by WGR 122 to form a composite upstream optical signal or WDM signal which is sent to central office 102 via upstream fiber 136. The use of the waveguide-grating router to perform both multiplexing and de-multiplexing functions is advantageous because conventional independent wavelength-division multiplexer pairs can create tracking and reference problems.

The ONUs 106a-n and/or remote node 104 can include optical amplifiers (not shown), such as erbium doped fiber amplifiers, for amplifying the upstream optical signals prior to transmission on the optical fibers 132a-n or 136. However, according to the present invention, since coherent detection results in effective amplification of the received signal, it is possible to avoid the use of such amplifiers, thereby resulting in additional cost savings.

Figure 2A:
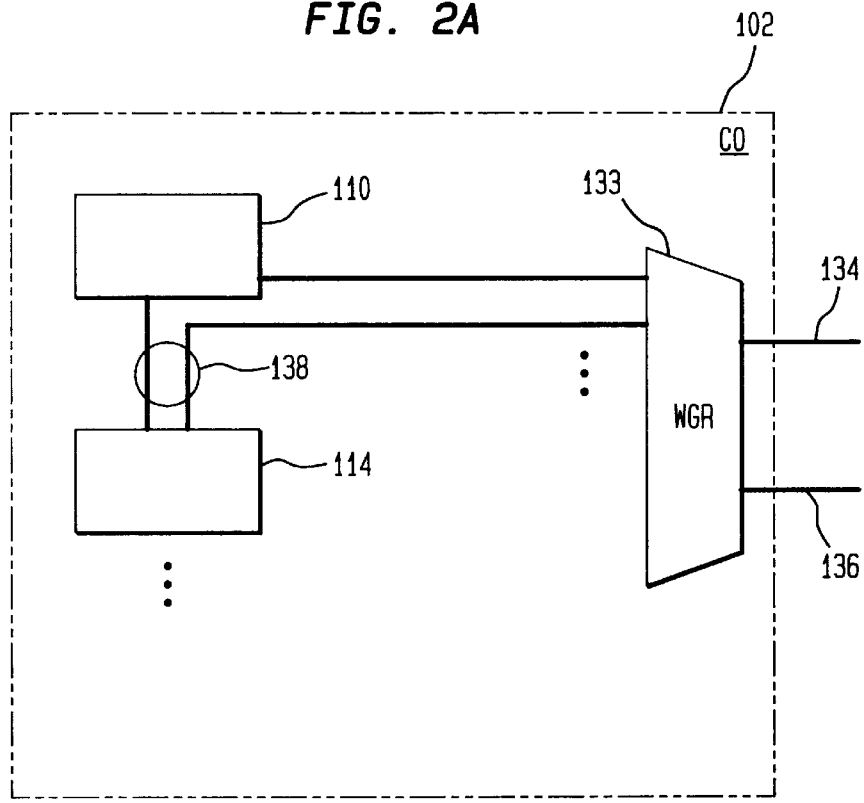
FIGS. 2A and 2B are block diagrams of central offices for implementing an embodiment of the present invention.

FIG. 2A depicts central office 102 according to an embodiment of the present invention. As shown, central office 102 includes an optical source 110 such as a laser that modulates and transmits downstream optical signals having a particular wavelength (or set of wavelengths). In this particular embodiment, the downstream optical signals are formed into a composite downstream optical signal by WGR 133 which routes the composite downstream optical signal to remote node 104 (FIG. 1) via fiber 134, where the composite downstream optical signal is separated and distributed to ONUs 106 by wavelength (or set of wavelengths). A composite upstream optical signal is received by central office 102 via fiber 136, and the WGR 133 routes an upstream optical signal having the particular wavelength (or set of wavelengths) from the composite upstream optical signal to optical coupler 138. The optical coupler 138 combines the received upstream optical signal with a local oscillator optical signal LO.

The combined optical signal is provided to coherent receiver 114 which processes the combined signal as necessary. In this particular embodiment, the coherent receiver 114 mixes, detects and receives the combined optical signal and converts it to a representative electrical signal. The coherent receiver 114 can include a photodetector (not shown), such as a photodiode operating as a square-law detector, to perform the mixing of the combined optical signal. As such, the mixing takes place on the photodiode because the photodiode produces a current proportional to the square of the electric field of the combined optical signal incident on the photodiode. In this particular example, the mixing occurs in the squaring process. Alternative examples of non-linear optical processing of the combined optical signal can be used for mixing the combined optical signal. Additionally, in this particular embodiment, one optical source 110, one optical coupler or combiner 138 and one receiver 114 are shown for each particular wavelength (or set of wavelengths).

If power budget, complexity and throughput considerations allow it, WGR 133 may not be necessary. It should be understood that embodiments are available including multiple optical sources 110 each producing optical signals having a particular wavelength (or set of wavelengths), multiple combiners for combining each of the upstream optical signals with a respective LO signal to produce respective combined optical signals, and multiple receivers for receiving and processing the combined signals. Other alternative arrangements are possible. For example, a single optical source 110 that produces optical signals having particular wavelengths (or sets of wavelengths) can be used with the multiple receivers 114 and multiple optical combiners 138.

By combining the local oscillator signal with a relatively low amplitude signal, coherent detection allows the relatively low amplitude optical signal to be easily detected at the receiver because the optical signal is effectively amplified by a factor proportional to the electric field produced by the local oscillator signal. In particular for a heterodyne coherent receiver, since the local oscillator signal originates at the receiving end it can be assumed that the amplitude of the electric field of the local oscillator signal $E_1$ is much greater than the amplitude of the electric field for the incoming optical signal $E_S$, where $E_L \cos(\omega_S \omega)t$ is the local oscillator field and $E_S \cos \omega_s t$ is the signal field with $\omega_S$ being the frequency of the optical signal and $\omega$ is the beat frequency. The current emitted by receiver 114 $i_c(t)$ is proportional to the square of the combined optical signal or $E_L^2 + E_S^2 + 2E_L E_S \cos \omega t$. The $E_L^2$ portion of the current signal is a DC component which can be easily filtered and removed. The $E_S^2$ portion of the current signal, assuming that the local oscillator field is sufficiently larger than the signal field, is negligible and can be ignored. What is left is a $2E_L E_S \cos \omega t$ portion which is more easily received and processed as necessary. Coherent detection thus provides effective amplification, allowing very low amplitude optical signals to be detected at the receiver.

Utilizing a star configuration, an appropriate local oscillator signal source 110 locked to the frequency of the upstream optical signal source already exists at the central office 102, thus eliminating the difficulty and expense previously associated with creating and locking the frequency of the LO signal. That is, the very same signal source 110 used for generating the downstream signals and consequently the upstream optical signals can be used to generate the local oscillator signal. This method of providing the LO signal is cost effective and efficient.

Figure 2B:
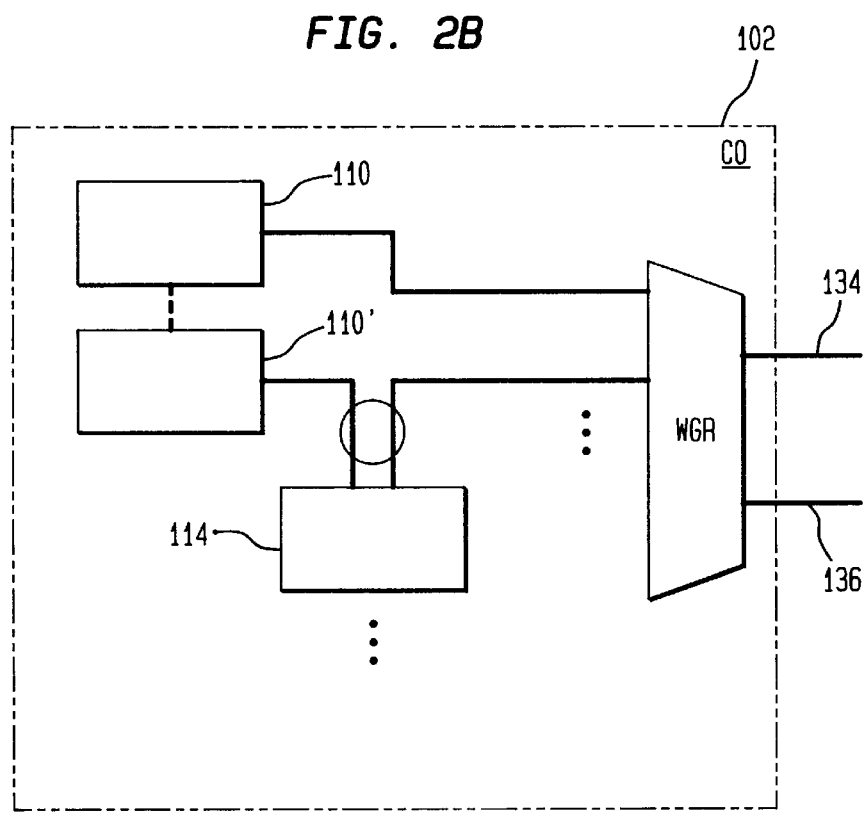

In an alternative embodiment of the present invention, a separate signal source, which is substantially identical to the signal source 110 used for generating the downstream signals, can be used to generate the local oscillator signals. Using a separate local oscillator signal source can alleviate any time sharing problems associated with embodiments of the coherent optical communications system using the optical source 110 to generate both the downstream optical signals and local oscillator signal LO. Accordingly, as shown in FIG. 2B, an additional laser source 110' at the central office 102 is dedicated to generating the local oscillator signal LO. Optical source 110' an be substantially identical as the optical source 110 and can be slaved or locked to the optical source 110 to generate an appropriate local oscillator signal LO as necessary for demodulating the received upstream optical signal.

Figure 3:
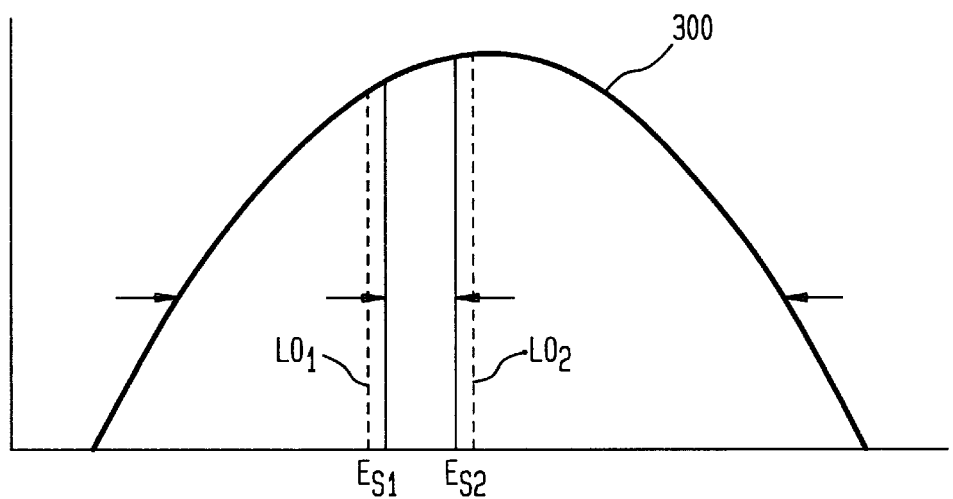
FIG. 3 is a graph illustrating advantages of embodiments of the present invention.

The present invention thus provides an efficient method of communicating optical signals, eliminating the need of providing amplification at each ONU. In addition, the present invention allows greater frequency selectivity which can lead to increased throughput. For example, FIG. 3 shows an optical frequency band 300 produced by an optical source 110 (FIG. 2a and 2b) for a particular ONU 106. By selectively tuning the local oscillator signals, different frequencies can be selected for the coherent receiver 114 (FIGS. 2a and 2b). Typically, a single signal, such as $E_{S1}$, is placed in the optical band 300, and the coherent receiver 114 receives the signal $E_{S1}$ by having a local oscillator signal $LO_1$ at the same frequency. Because coherence provides frequency selectivity, additional signals, such as $E_{S2}$, can be added to the optical band 300, thereby increasing the throughput. The coherent receiver 114 receives the signal $E_{S2}$ by selectively tuning the local oscillator signal $LO_2$ to the appropriate frequency. In doing so, the local oscillator signals $LO_1$ and $LO_2$ can be moved 5 or 10 GHz from each other but within the same band 300, so the signal $E_{S1}$ has information at the frequency of $LO_1$ and the signal $E_{S2}$ has information at the frequency of $LO_2$. Such selective tuning can be accomplished by using properly tuned filters, separate lasers or other ways to shift the frequency of the local oscillator signals.

The present invention also allows for the capability of performing diagnostics operations from the central office location. A known diagnostic operation that can be performed at the central office is the optical time domain reflectometry ("OTDR") test. This test is described, for example, by J. M. Senior in "Optical Fiber Communications", pp. 822–27 (Prentice Hall 1992).

In an OTDR test, a light pulse is provided at one end of an optical fiber, for example, at the central office. A measure of the light reflected back due to backscatter effects is then taken. The measure of backscattered light provides an indication of the status of the optical link to a node. Generally, if a particular ONU cannot communicate with the central office, the OTDR test is performed to determine if there is a cut in the fiber optical cable and to determine its approximate location. However, the backscattered light is generally very small in amplitude, making it difficult to properly receive and process.

Figure 4:
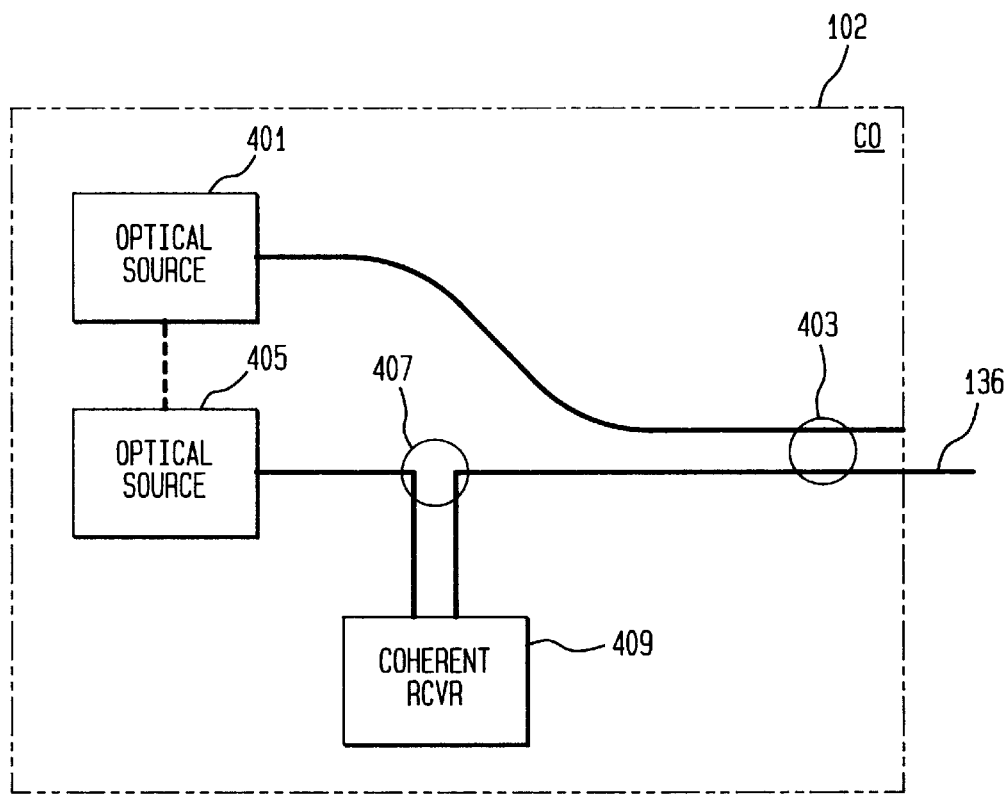
FIG. 4 shows a block diagram of a central office for implementing an optical time domain reflectometry (OTDR) test according to an embodiment of the present invention.

The present invention, utilizing coherent detection and its associated effective amplification, allows the low amplitude backscattered light to be easily received and processed. As shown in FIG. 4, optical source 401 is used for generating a light pulse that is sent down optical fiber 136, for example, via optical coupler 403. Optical source 405, which is slaved to optical source 401, is then used to generate an appropriate local oscillator signal LO for coherent detection of the backscattered light. Local oscillator signal LO is mixed with the backscattered optical signal by mixer 407. The mixed signal is then received and processed as necessary to provide a measure of the backscattered light, which can be used to determine the location of a fault in the fiber optic cable. Accordingly, by use of coherent detection, a very low amplitude optical signal can be easily received and processed to provide fault detection and isolation capabilities.

Alternative configurations of the coherent optical communication system according to the principles of the present invention are possible which omit or add components, use different schemes depending upon the particular embodiment and/or perform variations of the above-described scheme to reduce costs and enhance performance associated with current optical distribution networks. Additionally, alternative configurations of the coherent optical communication system are possible which relies on coherent optical signal detection to increase frequency selectivity which can lead to increased throughput and improved performance and to provide effective amplification of the received optical signals. In order to obtain the correct local oscillator (LO) signal frequency to properly demodulate the received upstream signal, certain embodiments use the same source to generate the upstream signal that provides the downstream signal and since the source for generating the downstream signal is at the central office where the received upstream signal is demodulated, the same or a similar source can be used for generating the upstream signal and the LO signal.

The coherent optical communication system has been described as being comprised several components, but it should be understood that the coherent optical communication system and portions thereof can be employed using optoelectronic integrated circuits, other forms of WGRs, additional receivers at the ONU and variations in the described configuration of different aspects of the coherent optical communication system. For example, a central office using the coherent optical communication system according to the principles of the present invention can take on various configurations. Furthermore, the coherent optical communication system according to the principles of the present invention can be implemented utilizing various combinations of application specific integrated circuits, software driven processing circuitry, or other arrangements of discrete components. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A coherent optical distribution system, said system comprising:
   an optical source for producing a downstream optical signal on a downstream optical path to be received at a downstream destination with a portion of said downstream optical signal being used to produce an upstream optical signal on an upstream optical path;
   an optical coupler coupled to said upstream optical path for combining said upstream optical signal and a local oscillator optical signal and producing a combined optical signal; and
   a coherent receiver coupled to said optical coupler for receiving and processing said combined optical signal to retrieve information modulated on said upstream optical signal.

2. The system of claim 1 wherein said optical source is coupled to said optical coupler for producing said local oscillator signal.

3. The system of claim 1 further including:
   a second optical source is coupled to said optical coupler for producing said local oscillator signal.

4. The system of claim 3 wherein said second optical source is locked to said optical source.

5. An optical distribution network comprising:
   a central office including,
   an optical source configured to produce a downstream optical signal on a downstream optical path;
   an optical coupler configured to receive an upstream optical signal on an upstream optical path and a local oscillator optical signal and to combine said upstream optical signal and said local oscillator optical signal to produce a combined optical signal, and
   a receiver coupled to said optical coupler which receives and processes said combined optical signal to retrieve information modulated on said upstream optical signal;
   an optical network unit receives said downstream optical signal on said downstream optical path and uses at least a portion of said downstream optical signal to produce said upstream optical signal on said upstream optical path; and
   a remote node configured to as a function of wavelength said downstream optical signal to said optical network unit, said remote node being further configured to receive said upstream optical signal and to provide said upstream optical signal to said central office.

6. The optical network of claim 5 wherein said optical source is coupled to said optical coupler and is configured to produce said downstream optical signal and said local oscillator signal.

7. The optical network of claim 5 further including a second optical source coupled to said optical coupler and configured to produce said local oscillator signal.

8. A method of communicating optical information comprising the steps of:
   producing a downstream optical signal by an optical source on a downstream optical path for a downstream destination;
   receiving an upstream optical signal on an upstream optical path from said downstream destination which uses a portion of said downstream optical signal to produce said upstream optical signal on said upstream optical path with upstream information modulated thereon;
   combining said upstream optical signal with a local oscillator signal to produce a combined optical signal; and
   processing said combined optical signal to recover upstream information modulated on said upstream optical signal.

9. The method of claim 8 further including the step of:
   producing by said optical source said local oscillator signal.

10. The method of claim 8 further including the step of:
    producing by a second optical source said local oscillator signal.

11. The method of claim 8 further including the step of:
    receiving said downstream optical signal; and
    using at least a portion of said downstream-optical signal to produce said upstream optical signal with upstream information modulated thereon.

12. The method of claim 10 further including the step of:
    locking said second optical source to said optical source.

* * * * *